Patented July 19, 1949

2,476,637

UNITED STATES PATENT OFFICE 2,476,637

METHOD OF PREPARING CHLOROFORMATES

Franklin Strain, Barberton, Ohio, and Wilbert F. Newton, Pittsburgh, Pa., assignors to Pittsburgh Plate Glass Company, Allegheny County, Pa., a corporation of Pennsylvania No Drawing. Application February 28, 1947, Serial No. 731,716

15 Claims. (Cl. 260—463)

This invention is concerned with the production of chloroformates. In the production of certain chloroformates by certain methods used yields of certain chloroformate are relatively poor and undesirable by-products frequently are produced.

This is particularly serious where high boiling chloroformates such as diethylene glycol bis chloroformate are prepared according to such prior processes, since chlorides or carbonates of high boiling point also tend to be prepared. Because of the high boiling points of these by-products separation thereof upon a commercial basis from the dichloroformate or similar high boiling product is difficult or even impossible.

Undue overheating of the reaction mixture is one of the causes of poor yields and undue by-product formation previously encountered. When an alcohol is reacted with phosgene, a very considerable quantity of heat is evolved. If this heat is not removed from the reaction mixture with sufficient rapidity, overheating of the reaction mixture occurs with consequent undesirably low yields and formation of objectionable by-products. Moreover, if the temperature of the reaction mixture is not essentially uniform, local overheating tends to occur with consequent undesirable results. For this reason cooling of the reaction mixture usually well below room temperature has frequently been regarded as essential prior to the present invention. On the other hand, if the reaction mixture is maintained unduly cold, reaction to form chloroformate is slow and problems of control become complicated and expensive.

In accordance with the present invention a new process has been provided whereby chloroformates may be prepared in improved yield and purity. According to the present invention chloroformates are prepared by establishing a liquid chloroformate solution of phosgene, adding the alcohol to be phosgenated and phosgene to the solution, vaporizing phosgene from the solution whereby to absorb at least a major portion of evolved heat of reaction and controlling the phosgene concentration of the solution so that the temperature of the solution remains above that at which phosgene is normally liquid (usually above about 10° C.) but below that at which excessive by-product formation occurs.

This process is advantageous since it results in the production of chloroformates in high yield, usually not less than 95 percent of theoretical, and also since it is simple to perform and simple to control. In performance a reactor which comprises for example a glass lined tank or other vessel is provided with a reflux condenser which is capable of condensing phosgene to liquid state and returning the condensed phosgene to the reaction vessel while permitting escape of uncondensed gases such as evolved HCl.

In the initiation of the reaction a pool of a liquid chloroformate, usually the chloroformate to be produced, is introduced into or generated in the reactor. Phosgene is introduced either in liquid state or as gaseous phosgene which may be bubbled into the chloroformate. When the phosgene concentration of the solution is sufficiently high to cause refluxing of phosgene, alcohol is added continuously or in small portions and further phosgene is added either in liquid state or in gaseous state. This addition may be into the reactor itself or into the reflux condenser.

As a consequence of the addition of the alcohol, the reaction occurs with formation of chloroformate and evolution of heat and HCl gas. The heat evolved causes phosgene to vaporize and thereby to absorb the evolved heat. The phosgene vapor and evolved HCl gas escape from the chloroformate to the reflux condenser whereby phosgene vapor is largely condensed and HCl escapes from the system. This rapid removal of HCl probably is a factor which facilitates ready and rapid formation of chloroformate.

The temperature of the reacting solution is maintained above normal liquid phosgene temperature, i. e. above about 10° C. Several advantages accrue by so doing. In the first place the reaction proceeds more rapidly at higher temperatures. Furthermore, control of the operation is easier.

It will be understood that the reactors normally used in commercial practice usually are opaque, generally being constructed at least partially of iron or steel, and it is not possible to see the reacting mixture at all times as the process proceeds. If such a large excess of phosgene is present that the temperature of the solution is that of normal liquid phosgene then further additions of phosgene will not produce a noticeable change in the temperature of the reacting mixture. Consequently, if phosgene is being introduced too rapidly into a reactor in such a situation, it is possible to fill the reactor and to flood the condenser with phosgene without the operator realizing this fact. This can be a seriously hazardous situation in view of the poisonous nature of phosgene.

By operating above liquid phosgene temperature, however, this problem does not arise. If too much phosgene is introduced the temperature of the reaction mixture falls until liquid phosgene temperature is reached or until the operator corrects the condition. The operator becomes aware of the presence of too much phosgene by the temperature fall and can adjust the relative rates of introduction of alcohol and phosgene into the reactor accordingly. Thus to prevent the temperature from falling the rate of phosgene introduction may be decreased and/or the rate of alcohol addition may be increased. On the other hand if the temperature rises unduly high, rate of introduction of alcohol may be decreased and/or rate of addition of phosgene increased.

As stated above, the temperature of the reaction mixture should be above normally liquid phosgene temperature i. e. not less than about 10° C. Higher temperatures, within the temperature range of 10 to 60° C., usually are preferable. Unduly high temperatures are undesirable since by-products such as carbonates and chlorides may be produced in objectionable amount. On the other hand, reaction tends to occur at a more rapid rate at temperatures above 10° C. than at lower temperatures and most chloroformates particularly chloroformates of alcohols containing up to 10 carbon atoms may be successfully prepared at 15–50° C. which frequently is an optimum temperature range. With certain chloroformates such as octadecyl chloroformate, and chloroformates of still higher aliphatic alcohols, temperatures which are above 60° or even as high as 75° C. may be desirable. However, it is rare that temperatures above 100° C. will be necessary in the present process.

The concentration of phosgene in the chloroformate determines to a large degree the temperature at which the solution will remain. With a phosgene-chloroformate solution at 15° C. and with phosgene refluxing in equilibrium with the solution without addition of alcohol, a chloroformate solution will contain about 75 mol percent of phosgene based upon the chloroformate in the solution. More than about 80 mol percent of phosgene in such a solution at equilibrium under reflux will establish the temperature at substantially that of normal liquid phosgene which is about 8° C. at standard conditions.

When alcohol is being added to a refluxing solution, the tolerable amount of phosgene is lower due to the evolution of HCl gas. Hence, at 15° C. a reacting chloroformate solution to which alcohol and phosgene are being added and phosgene is refluxing at equilibrium, will contain about 60 mol percent of phosgene, based upon the chloroformate of the solution and if the phosgene concentration greatly exceeds about 60 mol percent of phosgene based upon the chloroformate of the solution, the equilibrium temperature of the solution approximates that of normal liquid phosgene.

Consequently, the phosgene concentration should not, in general, exceed about 60 mol percent based upon the chloroformate concentration. Moreover, a minimum concentration of at least about 5 mol percent of phosgene must be maintained if the temperature is to be prevented from rising above 60° C. To achieve a temperature of 30° C. for example, in a reacting solution a phosgene concentration of about 30 mol percent is required.

These values will vary to some degree dependent upon the volatility of the chloroformate which is present. Moreover, the presence of other volatile components may change the concentrations required to establish the desired concentrations. However, the phosgene concentration of the solution generally is maintained within the range of 5 to 60 mol percent of phosgene based upon chloroformate in the solution.

The process may be initiated by introducing an initial concentration of the desired chloroformate if desired. Frequently, however, the initial concentration of the chloroformate is generated in situ in the reactor. In this case, a quantity of liquid phosgene is introduced into the reactor and allowed to reflux. The desired alcohol is added and reaction to form a chloroformate is commenced. The concentration of chloroformate is gradually built up in this manner. Addition of further phosgene is limited or is postponed until the excess of phosgene has been reduced and the temperature rises. When the temperature has reached the desired level, usually at 15 to 50° C. and rarely over 60° C. the rate of alcohol and phosgene addition is balanced to hold the temperature at the required level. Thereafter, the ratio of the phosgene to alcohol then admitted is controlled so as to have the total heat absorbed by the vaporizing phosgene and the heat absorbed by the returning liquid phosgene and by the added reactants balance the heat evolved in the reaction.

It will be understood that while at least the major amount of heat evolved is absorbed by vaporizing phosgene it is not necessary that all of such heat be so absorbed. Thus some heat may be absorbed by cooling the reactants, i. e. by introducing the phosgene in liquid state into the reactor. Furthermore, some external cooling frequently is resorted to at least in the early stages of the reaction. Nevertheless, most of the evolved heat is absorbed by the vaporizing and refluxing phosgene.

In general, the chloroformate used to dissolve the phosgene will be the chloroformate of the alcohol which is reacted with the phosgene since this eliminates necessity for solvent recovery processes. However, other chloroformates may be used as the solvent if desired. For example, a chloroformate of a lower aliphatic alcohol such as methyl or ethyl chloroformate may be used as the solvent for formation of a higher chloroformate such as tetraethylene glycol bis chloroformate, or phenylene bis chloroformate.

The following examples are illustrative:

Example I

A glass reaction vessel, equipped with a brine-cooled reflux condenser, an agitator and a delivery tube, is charged with approximately 500 gms. of liquid phosgene. Ethyl alcohol is slowly introduced into the reaction vessel, initiation of the reaction being indicated by vaporization of a part of the phosgene. Phosgene vapor is condensed in the reflux condenser and returned to the reaction vessel. After approximately 100 gms. of ethyl alcohol have been introduced, liquid phosgene is also fed into the reaction vessel at approximately twice the rate of the alcohol to ensure maintenance of an excess of phosgene. The addition is continued until 460 gms. of ethyl alcohol and 1000 gms. of phosgene have been introduced. The temperature of the reaction mixture is controlled by adjustment of the rate of reflux of the phosgene is maintained between 15 and 30° C. This, in turn, is regulated by the flow and relative proportions of phosgene and alcohol introduced into the reaction mixture. During this operation the concentration of phosgene in the solution remains at about 20 to 40 mol percent based upon the chloroformate in solution. The product is degassed by evacuation at reduced pressure and washed with ice water. 976 gms. of ethyl chloroformate is obtained, representing a yield of approximately 90%. The product is approximately 99.7% pure.

*Example II*

300 gms. of isopropyl alcohol is reacted with 500 gms. of phosgene in the same manner as described in Example I. There is obtained approximately 563 gms. of isopropyl chloroformate of 99.5% purity, representing a yield of 92%.

*Example III*

116 gms. of allyl alcohol is reacted with 200 gms. of phosgene in the same manner as described in Example I, with the exception that gaseous phosgene is introduced during the second phase of the process to accomplish the necessary agitation of the reaction mixture. The gaseous phosgene is sufficiently soluble in the chloroformate that an undue load is not placed upon the reflux condenser. The allyl chloroformate is degassed and washed in the manner already set forth. The yield is approximately 225 gms. (95%) of allyl chloroformate of 99.6% purity.

*Example IV*

A 245 gallon jacketed kettle was provided with a nickel reflux condenser cooled by minus 2° to minus 9° F. brine and an overflow tube was placed in the upper part of the kettle. Liquid phosgene was introduced into the kettle at a rate of 188 pounds per hour and allowed to reflux. After 204 pounds of phosgene had been introduced, addition of diethylene glycol was begun at a rate of 66 pounds per hour. After about 152 pounds of diethylene glycol had been added the temperature rose to 33° C. Up to this point about 284 pounds of phosgene had reacted with the glycol, 61 pounds of phosgene had dissolved in the mixture and the remainder escaped with evolved HCl through the condenser. Addition of gaseous phosgene and diethylene glycol into the chloroformate solution was continued at the same rates over a period of many hours slight adjustments in the rate of addition of the reactants being made in order to hold the temperature of the chloroformate at about 30° C. During the operation, the concentration of phosgene in the chloroformate remained at about 25 to 35 percent based upon the chloroformate in the mixture. Phosgene refluxed in the condenser and evolved HCl together with a quantity of phosgene continuously escaped from the system by passing through the condenser.

During the process, the kettle filled up and began to overflow through the overflow tube. The rate of addition of reactants was such that the average retention time was about 18 hours.

Chloroformate was continuously withdrawn through the tube into a degassing chamber where the diethylene glycol bis chloroformate was heated to 95° C. in order to remove dissolved phosgene and thereafter further phosgene was stripped from the chloroformate by bubbling dry air therethrough. The yield of dichloroformate obtained was over 99 percent of theoretical. Approximately 200 pounds per hour of diethylene glycol bis chloroformate was obtained by this process.

*Example V*

Six mols of 2,3-carbonyldioxy propyl chloroformate was introduced into a three liter three-neck flask which was immersed in a 30-40° C. water bath and which was provided with an agitator, inlets for liquid phosgene and glycerol and a reflux condenser cooled by a dry ice-acetone mixture. The flask also was provided with an outlet for removal of chloroformate from the reactor.

Glycerol was introduced into the reactor at a rate of one mole per hour and phosgene was introduced at an immeasured rate sufficient to maintain the temperature of the liquid reaction mixture at 25-30° C. The process was carried out continuously for a period of 7½ hours and periodic withdrawal of the product which was 2,3-carbonyl dioxy propyl chloroformate was begun six hours after the reaction had initiated. The rate of withdrawal was adjusted so that the average retention time was six hours. During operation the concentration of phosgene remained at approximately 30-35 mol percent based upon the chloroformate in the mixture.

The process herein described is especially valuable since it may be used for production of a wide variety of chloroformates. Thus this process may be applied to reaction of phosgene with various alcohols or hydroxy compounds which contain an alcoholic hydroxy group (hydroxy group which is esterifiable with acids) preferably primary and secondary alcohols particularly those forming liquid chloroformates such as the lower aliphatic alcohols including methanol, ethanol, isopropanol, n-propanol, isobutanol, n-butanol, secondary butanol, 2-nitropropanol-1, and methyl-tert-butyl carbinol, neo-pentyl alcohol, 1-chloroethyl alcohol, 2-chloro-ethyl alcohol, 1-chloro-isopropyl alcohol, etc. and unsaturated alcohols such as allyl alcohol, methallyl alcohol, crotyl alcohol, propargyl alcohol, methyl vinyl carbinol, linallyl alcohol or 2-chloroallyl alcohol and the higher aliphatic alcohols such as lauryl alcohol, octyl alcohol, hexyl alcohol, etc. and the aryl, aryl-alkyl and other cyclo alcohols or hydroxy compounds including benzyl alcohol, cyclohexyl alcohol, tetrahydrofurfuryl and furfuryl alcohols. Furthermore, chloroformates of polyhydroxy compounds or other more complex hydroxy compounds can be prepared by this process including the chloroformates of glycols and polyglycols such as ethylene glycol, diethylene glycol, triethylene glycol, tetraethylene glycol, propylene glycol, dipropylene glycol, trimethylene glycol, erythrol and other polyhydroxy compounds such as glycerol, polyglycerol, alpha methyl glycerol, phthalyl alcohol, hydroquinone, pyrogallol, bis phenol A (isopropylidene bis phenol) and the like, and hydroxy esters such as methyl lactate, ethyl lactate, allyl lactate, ethyl glycollate, ethylene glycol dilactate, glycerol di- or trilactate, castor oil, mono ethers or esters of glycols such as n-butyl cellusolve, 2-benzoxy ethyl ethyl alcohol, 2-formoxy ethyl alcohol, 2 isocynaoethyl alcohol, 2 methoxy ethyl alcohol, butyl carbitol, etc.

Although the present invention has been described with reference to specific details of certain embodiments thereof it is not intended that such details shall be regarded as limitations upon the scope of the invention except insofar as included in the accompanying claims.

This application is a continuation in part of our copending application Serial No. 483,072, filed April 14, 1943, which has been abandoned.

What is claimed:

1. A method of preparing a chloroformate of an alcohol capable of reacting with phosgene to form a chloroformate which comprises establishing a liquid solution of phosgene dissolved in a chloroformate, adding said alcohol and liquid phosgene to the solution with consequent formation of further chloroformate and evolution of heat of reaction, permitting vaporization of phosgene from the solution with consequent absorption of heat of reaction, and maintaining the phosgene concentration of the solution sufficiently high to cause vaporization of an amount of phosgene sufficient so that the major portion of evolved heat of reaction is absorbed by the vaporizing phosgene and the added alcohol and phosgene and maintaining the concentration of phosgene sufficiently low during addition of alcohol to maintain the temperature of the solution above that at which phosgene is normally liquid.

2. The process of claim 1 wherein the phosgene concentration is maintained above about 5 mol percent and not in excess of about 80 mol percent based upon the chloroformate in the solution.

3. A method of preparing a chloroformate of an alcohol which reacts with phosgene to form a chloroformate which comprises establishing a solution of phosgene in a liquid chloroformate, adding said alcohol and phosgene to the solution with consequent formation of chloroformate and evolution of heat of reaction, permitting vaporization of sufficient phosgene to absorb said evolved heat, maintaining the phosgene concentration sufficiently high to permit said vaporization but below the concentration at which the vaporizing phosgene reduces the solution temperature, during alcohol addition, to that at which phosgene is normally liquid whereby the temperature of the solution during addition of alcohol thereto remains above that at which phosgene is normally liquid.

4. A method of preparing a chloroformate of an alcohol which reacts with phosgene to form a chloroformate which comprises establishing a solution of phosgene in a liquid chloroformate, adding said alcohol and phosgene to the solution with consequent formation of chloroformate and evolution of heat of reaction, permitting vaporization of sufficient phosgene to absorb said evolved heat and maintaining the phosgene concentration sufficiently low to prevent the temperature of the solution from falling below 10° C. and sufficiently high to prevent the temperature of solution from exceeding 100° C.

5. A method of preparing a chloroformate of an alcohol which reacts with phosgene to form a chloroformate which comprises establishing a solution of phosgene in a liquid chloroformate, adding said alcohol and liquid phosgene to the solution with consequent formation of chloroformate and evolution of heat of reaction, permitting vaporization of sufficient phosgene to absorb said evolved heat and maintaining the phosgene concentration of the solution at a concentration such as to maintain the temperature of the solution in the approximate range of 10 to 60° C.

6. A method of preparing a chloroformate of an alcohol capable of reacting with phosgene to form a chloroformate which comprises establishing a liquid chloroformate solution of phosgene, adding phosgene and an alcohol to the solution whereby to form a chloroformate of the alcohol with consequent evolution of heat of reaction, permitting vaporization of phosgene from the solution with consequent absorption of heat and maintaining the concentration of the phosgene in the chloroformate solution sufficiently high to cause vaporization of an amount of phosgene sufficient so that said heat of reaction is absorbed by the vaporizing phosgene and by the added reactants, said phosgene concentration being maintained sufficiently low to prevent cooling of the solution during alcohol addition to the temperature at which phosgene is normally liquid.

7. A process of claim 1 wherein the alcohol is a glycol.

8. The process of claim 1 wherein the alcohol is a monohydric aliphatic primary alcohol.

9. The process of claim 1 wherein the alcohol is a monohydric aliphatic secondary alcohol.

10. A method of preparing a chloroformate which comprises reacting an alcohol with phosgene in a chloroformate solution of phosgene at a temperature above that at which phosgene normally is liquid, and permitting vaporization of phosgene from the solution, whereby to remove evolved heat of reaction, while maintaining the concentration of phosgene in the solution sufficiently in excess of the theoretical to cause vaporization of phosgene from the solution as a consequence of the evolved heat of reaction, said phosgene concentration being maintained sufficiently low to prevent cooling of the solution during alcohol addition to the temperature at which phosgene is normally liquid.

11. A method of preparing a chloroformate of an alcohol capable of reacting with phosgene to form a chloroformate which comprises establishing a pool of liquid phosgene, adding said alcohol thereto until the quantity of phosgene present has been diminished to the point where the temperature of the reaction mixture rises above that at which phosgene normally is liquid and thereafter adding further alcohol and phosgene to the mixture and permitting phosgene to vaporize from the mixture, whereby to absorb evolved heat of reaction, at a rate such that the temperature of the mixture remains above about 10° C. and the amount of phosgene in the solution remains in excess of that required to react with the alcohol.

12. A method of preparing a chloroformate of an alcohol capable of reacting with phosgene to form a chloroformate which comprises establishing a pool of liquid phosgene, adding said alcohol thereto until the quantity of phosgene present has been diminished to the point where the temperature of the reaction mixture rises above that at which phosgene normally is liquid and thereafter adding further alcohol and phosgene to the mixture and permitting phosgene to vaporize from the mixture, whereby to absorb evolved heat of reaction, at a rate such that the temperature of the mixture remains above about 10° C. but below about 60° C. and the amount of phosgene in the solution remains in excess of that required to react with the alcohol.

13. A method of preparing a chloroformate which comprises adding an alcohol to a liquid chloroformate solution, maintaining the phosgene concentration of the solution substantially in excess of that required to react with the alcohol and maintaining the temperature of the solution above that at which phosgene normally is liquid while permitting vaporization of phosgene from the solution, whereby to remove evolved heat of reaction, said phosgene concentration being maintained sufficiently low to prevent cooling of the solution, during alcohol addition, to the temperature at which phosgene is normally liquid.

14. A method of preparing a chloroformate which comprises adding an alcohol to a liquid chloroformate solution of phosgene, permitting vaporization of phosgene from the solution, whereby to remove heat of reaction evolved by reaction of the alcohol with phosgene, and maintaining the phosgene concentration above 5 mol percent but not in excess of 80 mol percent of the chloroformate in the solution during the alcohol addition.

15. A method of preparing a chloroformate which comprises adding an alcohol to a liquid chloroformate solution of phosgene, permitting vaporization of phosgene from the solution, whereby to remove heat of reaction evolved by reaction of the alcohol with the phosgene, and adding liquid phosgene to the solution at a rate sufficient to maintain the phosgene above 5 mol percent but not above 80 mol percent of the chloroformate in the solution during the alcohol addition and maintaining the temperature of the solution above that at which phosgene normally is liquid but below 100° C.

FRANKLIN STRAIN.
WILBERT F. NEWTON.

REFERENCES CITED

The following references are of record in the file of this patent:

UNITED STATES PATENTS

| Number | Name | Date |
|---|---|---|
| 1,618,824 | Hammond | Feb. 22, 1927 |
| 1,955,873 | Deanesly | Apr. 24, 1934 |
| 2,010,841 | Bender | Aug. 13, 1935 |
| 2,136,178 | Carothers et al. | Nov. 8, 1938 |
| 2,370,568 | Muskat et al. | Feb. 27, 1945 |
| 2,397,630 | Strain | Apr. 2, 1946 |

OTHER REFERENCES

Cappelli, "Gazz. Chim. Ital., vol. 50, pt. II, pages 8–12 (1920); also corresponding abstract in "Chem. Abstracts," vol. 15 page 524 (1921).

Oesper et al., "Jour. Am. Chem. Soc.," vol. 47, pages 2609–2610 (1925).